United States Patent
Wang et al.

(10) Patent No.: US 12,167,338 B2
(45) Date of Patent: Dec. 10, 2024

(54) MEASUREMENT REPORTING METHOD, ELECTRONIC DEVICE, AND STORAGE MEDIUM

(71) Applicant: GUANGDONG OPPO MOBILE TELECOMMUNICATIONS CORP., LTD., Dongguan (CN)

(72) Inventors: Zhi Wang, Dongguan (CN); Kai Tang, Dongguan (CN); Yang Xia, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 326 days.

(21) Appl. No.: 17/526,797

(22) Filed: Nov. 15, 2021

(65) Prior Publication Data

US 2022/0078682 A1    Mar. 10, 2022

Related U.S. Application Data

(63) Continuation of application No. PCT/CN2020/089250, filed on May 8, 2020.

(30) Foreign Application Priority Data

May 16, 2019 (CN) .......................... 201910405971.7
Sep. 16, 2019 (CN) .......................... 201910872430.5

(51) Int. Cl.
*H04W 52/02* (2009.01)
*H04L 1/00* (2006.01)
(Continued)

(52) U.S. Cl.
CPC ....... *H04W 52/0258* (2013.01); *H04L 1/0002* (2013.01); *H04L 5/0055* (2013.01);
(Continued)

(58) Field of Classification Search
CPC ..... H04W 76/30; H04W 76/34; H04W 76/18; H04W 48/16; H04W 48/02; H04W 48/20; H04W 48/18; H04L 43/16; H04L 43/0888
See application file for complete search history.

(56) References Cited

U.S. PATENT DOCUMENTS 9,414,298 B1    8/2016  Pasupuleti et al.
10,237,841 B1   3/2019  Krishnamurthy et al.
(Continued)

FOREIGN PATENT DOCUMENTS

CN    1152142 A    6/1997
CN    1507753 A    6/2004
(Continued)

OTHER PUBLICATIONS

Extended European Search Report dated Jun. 29, 2022 received in European Patent Application No. EP20806524.3.
(Continued)

*Primary Examiner* — Mahran Y Abu Roumi
(74) *Attorney, Agent, or Firm* — Sheppard, Mullin, Richter & Hampton LLP (57) ABSTRACT

The present disclosure discloses a measurement reporting method. The method includes: transmitting, by a terminal device while the terminal device has access to both a first network and a second network, Secondary Cell Group (SCG) failure information to a network device, the SCG failure information including no measurement result for the second network; and establishing, by the terminal device, a connection with the network device via the first network, without reporting any measurement result for the second network to the network device. The present disclosure also discloses another measurement reporting method, an electronic device, and a storage medium.

14 Claims, 4 Drawing Sheets

(51) Int. Cl.

| | |
|---|---|
| *H04L 5/00* | (2006.01) |
| *H04W 24/08* | (2009.01) |
| *H04W 24/10* | (2009.01) |
| *H04W 28/02* | (2009.01) |
| *H04W 28/086* | (2023.01) |
| *H04W 36/00* | (2009.01) |
| *H04W 36/30* | (2009.01) |
| *H04W 48/02* | (2009.01) |
| *H04W 48/20* | (2009.01) |
| *H04W 60/00* | (2009.01) |
| *H04W 60/04* | (2009.01) |
| *H04W 76/15* | (2018.01) |
| *H04W 76/18* | (2018.01) |
| *H04W 76/19* | (2018.01) |
| *H04W 76/20* | (2018.01) |
| *H04W 76/30* | (2018.01) |
| *H04W 76/34* | (2018.01) |
| *H04W 88/06* | (2009.01) |
| *H04W 84/02* | (2009.01) |
| *H04W 88/08* | (2009.01) |
| *H04W 92/02* | (2009.01) |
| *H04W 92/10* | (2009.01) |

(52) U.S. Cl.
CPC .......... *H04W 24/08* (2013.01); *H04W 24/10* (2013.01); *H04W 28/0278* (2013.01); *H04W 28/0865* (2023.05); *H04W 36/0069* (2018.08); *H04W 36/0085* (2018.08); *H04W 36/305* (2018.08); *H04W 48/02* (2013.01); *H04W 48/20* (2013.01); *H04W 52/0212* (2013.01); *H04W 52/0261* (2013.01); *H04W 52/028* (2013.01); *H04W 60/005* (2013.01); *H04W 60/04* (2013.01); *H04W 76/15* (2018.02); *H04W 76/18* (2018.02); *H04W 76/19* (2018.02); *H04W 76/20* (2018.02); *H04W 76/30* (2018.02); *H04W 76/34* (2018.02); *H04W 36/00698* (2023.05); *H04W 84/02* (2013.01); *H04W 88/06* (2013.01); *H04W 88/08* (2013.01); *H04W 92/02* (2013.01); *H04W 92/10* (2013.01); *Y02D 30/70* (2020.08)

(56) References Cited

U.S. PATENT DOCUMENTS

| | | | |
|---|---|---|---|
| 2013/0155894 A1 | 6/2013 | Li et al. | |
| 2014/0128075 A1 | 5/2014 | Da Silva et al. | |
| 2014/0286305 A1 | 9/2014 | Yamada | |
| 2014/0309929 A1 | 10/2014 | Ricci | |
| 2015/0045035 A1 | 2/2015 | Nigam et al. | |
| 2015/0049737 A1 | 2/2015 | Yang et al. | |
| 2015/0128699 A1 | 5/2015 | Maki et al. | |
| 2015/0271864 A1 | 9/2015 | Nigam et al. | |
| 2015/0312811 A1 | 10/2015 | Lei et al. | |
| 2016/0127998 A1 | 5/2016 | Roessel et al. | |
| 2016/0242191 A1* | 8/2016 | Liao .............. | H04W 24/10 |
| 2016/0242226 A1 | 8/2016 | Fushiki et al. | |
| 2016/0345192 A1 | 11/2016 | Garg et al. | |
| 2016/0345251 A1 | 11/2016 | Islam et al. | |
| 2017/0041983 A1 | 2/2017 | Jha et al. | |
| 2017/0164281 A1* | 6/2017 | Chiba .............. | H04W 72/0446 |
| 2017/0171786 A1 | 6/2017 | Mochizuki et al. | |
| 2017/0215185 A1 | 7/2017 | Fukuta et al. | |
| 2017/0311369 A1 | 10/2017 | Chiba et al. | |
| 2018/0220294 A1 | 8/2018 | Ukil et al. | |
| 2018/0220483 A1 | 8/2018 | Hayashi | |
| 2018/0270682 A1 | 9/2018 | Zacharias et al. | |
| 2018/0368016 A1 | 12/2018 | Lee et al. | |
| 2019/0037425 A1 | 1/2019 | Hong et al. | |
| 2019/0075585 A1 | 3/2019 | Deogun et al. | |
| 2019/0090144 A1 | 3/2019 | Wu | |
| 2019/0101970 A1 | 4/2019 | Ge et al. | |
| 2019/0306775 A1 | 10/2019 | Duan | |
| 2019/0357095 A1 | 11/2019 | Pakniat et al. | |
| 2020/0008152 A1 | 1/2020 | Stauffer et al. | |
| 2020/0100181 A1* | 3/2020 | Jia .............. | H04W 48/12 |
| 2020/0145986 A1 | 5/2020 | Park et al. | |
| 2020/0351771 A1* | 11/2020 | Geekie .............. | H04W 76/30 |
| 2020/0351792 A1* | 11/2020 | Ghelichi .............. | H04W 24/10 |
| 2021/0028976 A1 | 1/2021 | Jia et al. | |
| 2021/0136631 A1 | 5/2021 | Lee et al. | |
| 2021/0185753 A1 | 6/2021 | Mattam et al. | |
| 2021/0235365 A1 | 7/2021 | Jin et al. | |
| 2021/0329723 A1 | 10/2021 | Teyeb et al. | |
| 2021/0409900 A1 | 12/2021 | Wang et al. | |
| 2022/0210675 A1 | 6/2022 | Cui et al. | |

FOREIGN PATENT DOCUMENTS

| | | |
|---|---|---|
| CN | 1805578 A | 7/2006 |
| CN | 101064916 A | 10/2007 |
| CN | 101217824 A | 7/2008 |
| CN | 101267240 A | 9/2008 |
| CN | 101277490 A | 10/2008 |
| CN | 101459974 A | 6/2009 |
| CN | 101461264 A | 6/2009 |
| CN | 101583136 A | 11/2009 |
| CN | 101669391 A | 3/2010 |
| CN | 101730058 A | 6/2010 |
| CN | 101772094 A | 7/2010 |
| CN | 101801072 A | 8/2010 |
| CN | 101917033 A | 12/2010 |
| CN | 101977272 A | 2/2011 |
| CN | 102131207 A | 7/2011 |
| CN | 102143562 A | 8/2011 |
| CN | 102156530 A | 8/2011 |
| CN | 102202421 A | 9/2011 |
| CN | 102238756 A | 11/2011 |
| CN | 102281556 A | 12/2011 |
| CN | 102413502 A | 4/2012 |
| CN | 102655664 A | 9/2012 |
| CN | 102695257 A | 9/2012 |
| CN | 102843724 A | 12/2012 |
| CN | 102907163 A | 1/2013 |
| CN | 103037417 A | 4/2013 |
| CN | 101208966 B | 6/2013 |
| CN | 103179601 A | 6/2013 |
| CN | 103428780 A | 12/2013 |
| CN | 103442413 A | 12/2013 |
| CN | 103491600 A | 1/2014 |
| CN | 103889032 A | 6/2014 |
| CN | 103907370 A | 7/2014 |
| CN | 103945502 A | 7/2014 |
| CN | 104159281 A | 11/2014 |
| CN | 104247553 A | 12/2014 |
| CN | 104333890 A | 2/2015 |
| CN | 104427596 A | 3/2015 |
| CN | 104468029 A | 3/2015 |
| CN | 104519521 A | 4/2015 |
| CN | 104519529 A | 4/2015 |
| CN | 104797009 A | 7/2015 |
| CN | 104811982 A | 7/2015 |
| CN | 104936223 A | 9/2015 |
| CN | 104936228 A | 9/2015 |
| CN | 104937985 A | 9/2015 |
| CN | 104955080 A | 9/2015 |
| CN | 105101253 A | 11/2015 |
| CN | 105122863 A | 12/2015 |
| CN | 105142238 A | 12/2015 |
| CN | 105144833 A | 12/2015 |
| CN | 105228229 A | 1/2016 |
| CN | 105307269 A | 2/2016 |
| CN | 105323833 A | 2/2016 |
| CN | 105430726 A | 3/2016 |
| CN | 105453649 A | 3/2016 |
| CN | 105472667 A | 4/2016 |
| CN | 105517109 A | 4/2016 |
| CN | 105578526 A | 5/2016 |
| CN | 105745957 A | 7/2016 |

(56) References Cited

FOREIGN PATENT DOCUMENTS

| | | |
|---|---|---|
| CN | 105915886 A | 8/2016 |
| CN | 205490137 U | 8/2016 |
| CN | 105940756 A | 9/2016 |
| CN | 105981442 A | 9/2016 |
| CN | 106068658 A | 11/2016 |
| CN | 106102143 A | 11/2016 |
| CN | 106160963 A | 11/2016 |
| CN | 106162744 A | 11/2016 |
| CN | 106302984 A | 1/2017 |
| CN | 106304019 A | 1/2017 |
| CN | 106454889 A | 2/2017 |
| CN | 106550490 A | 3/2017 |
| CN | 106576255 A | 4/2017 |
| CN | 106576381 A | 4/2017 |
| CN | 106686661 A | 5/2017 |
| CN | 106714286 A | 5/2017 |
| CN | 106879038 A | 6/2017 |
| CN | 107005899 A | 8/2017 |
| CN | 107040956 A | 8/2017 |
| CN | 107046701 A | 8/2017 |
| CN | 107222612 A | 9/2017 |
| CN | 107241678 A | 10/2017 |
| CN | 107295591 A | 10/2017 |
| CN | 107466073 A | 12/2017 |
| CN | 107682909 A | 2/2018 |
| CN | 107734521 A | 2/2018 |
| CN | 107809773 A | 3/2018 |
| CN | 107872851 A | 4/2018 |
| CN | 107995635 A | 5/2018 |
| CN | 108024314 A | 5/2018 |
| CN | 207382188 U | 5/2018 |
| CN | 105517129 B | 6/2018 |
| CN | 108134657 A | 6/2018 |
| CN | 108156670 A | 6/2018 |
| CN | 108270709 A | 7/2018 |
| CN | 108323242 A | 7/2018 |
| CN | 108337695 A | 7/2018 |
| CN | 108353380 A | 7/2018 |
| CN | 207611273 U | 7/2018 |
| CN | 108401514 A | 8/2018 |
| CN | 108401537 A | 8/2018 |
| CN | 108476382 A | 8/2018 |
| CN | 108490464 A | 9/2018 |
| CN | 108566672 A | 9/2018 |
| CN | 108632851 A | 10/2018 |
| CN | 108632880 A | 10/2018 |
| CN | 108632902 A | 10/2018 |
| CN | 108696881 A | 10/2018 |
| CN | 108738079 A | 11/2018 |
| CN | 108738115 A | 11/2018 |
| CN | 108810962 A | 11/2018 |
| CN | 108882327 A | 11/2018 |
| CN | 108886733 A | 11/2018 |
| CN | 108934021 A | 12/2018 |
| CN | 109040327 A | 12/2018 |
| CN | 109076330 A | 12/2018 |
| CN | 109151921 A | 1/2019 |
| CN | 109168179 A | 1/2019 |
| CN | 109246846 A | 1/2019 |
| CN | 109257777 A | 1/2019 |
| CN | 109286940 A | 1/2019 |
| CN | 109314895 A | 2/2019 |
| CN | 109314966 A | 2/2019 |
| CN | 109327886 A | 2/2019 |
| CN | 109392000 A | 2/2019 |
| CN | 109392003 A | 2/2019 |
| CN | 109429213 A | 3/2019 |
| CN | 109429263 A | 3/2019 |
| CN | 109429267 A | 3/2019 |
| CN | 109462527 A | 3/2019 |
| CN | 109548107 A | 3/2019 |
| CN | 109587757 A | 4/2019 |
| CN | 109588064 A | 4/2019 |
| CN | 109661016 A | 4/2019 |
| CN | 110300461 A | 10/2019 |
| CN | 110505652 A | 11/2019 |
| CN | 110536344 A | 12/2019 |
| CN | 110536345 A | 12/2019 |
| CN | 110536346 A | 12/2019 |
| CN | 110536347 A | 12/2019 |
| CN | 110557777 A | 12/2019 |
| CN | 110557778 A | 12/2019 |
| CN | 110557781 A | 12/2019 |
| CN | 110913504 A | 3/2020 |
| CN | 111669805 A | 9/2020 |
| CN | 110677869 B | 8/2021 |
| EP | 2592874 A1 | 5/2013 |
| EP | 2704485 A4 | 7/2014 |
| EP | 2879306 A1 | 6/2015 |
| EP | 2983445 A1 | 2/2016 |
| EP | 3016449 A1 | 5/2016 |
| EP | 3048748 A1 | 7/2016 |
| EP | 3116269 A1 | 1/2017 |
| EP | 3328119 A1 | 5/2018 |
| EP | 3331192 A1 | 6/2018 |
| EP | 3461219 A1 | 3/2019 |
| EP | 3462788 A1 | 4/2019 |
| EP | 3565298 A1 | 11/2019 |
| EP | 3606223 A1 | 2/2020 |
| EP | 3720240 A1 | 10/2020 |
| JP | 2011203591 A | 10/2011 |
| WO | WO2012044713 A1 | 4/2012 |
| WO | 2013140202 A1 | 9/2013 |
| WO | 2015113289 A1 | 8/2015 |
| WO | 2021115030 A1 | 6/2016 |
| WO | WO2016122369 A1 | 8/2016 |
| WO | WO2017059889 A1 | 4/2017 |
| WO | WO2017218762 A1 | 12/2017 |
| WO | WO2018014339 A1 | 1/2018 |
| WO | 2018045804 A1 | 3/2018 |
| WO | WO2018060548 A1 | 4/2018 |
| WO | WO2018117928 A1 | 6/2018 |
| WO | 2018121382 A1 | 7/2018 |
| WO | 2018125686 A2 | 7/2018 |
| WO | 2018130115 A1 | 7/2018 |
| WO | WO2018126547 A1 | 7/2018 |
| WO | WO2018129453 A1 | 7/2018 |
| WO | 2018174038 A1 | 9/2018 |
| WO | 2018174791 A1 | 9/2018 |
| WO | 2018202777 A1 | 11/2018 |
| WO | 2018231115 A1 | 12/2018 |
| WO | WO2019004667 A1 | 1/2019 |
| WO | WO2019008707 A1 | 1/2019 |
| WO | WO-2019037702 A1 * | 2/2019 ............ H04W 24/08 |
| WO | WO2019059673 A1 | 3/2019 |
| WO | 2019062616 A1 | 4/2019 |
| WO | 2019065814 A1 | 4/2019 |
| WO | 2019118157 A1 | 6/2019 |
| WO | 2020199227 A1 | 10/2020 |
| WO | 2020223520 A1 | 11/2020 |
| WO | 2020251815 A1 | 12/2020 |
| WO | 2021030422 A1 | 2/2021 |
| WO | 2021052244 A1 | 3/2021 |
| WO | 2021126798 A1 | 6/2021 |

OTHER PUBLICATIONS

Anonymous:"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)" ,3GPP Standard; Technical Specification;3GPP TS 36.300 , 3rd Generation Partnership Project (3GPP) , Mobile Competence Centre 650 , Route Des Lucioles ; F-06921 Sophia-Ant Ipolis Cedex ; France , vol. RAN WG2 , No. V15.5.0 , Apr. 17, 2019.

Extended European Search Report dated May 4, 2022 received in European Patent Application No. EP20806215.8.

Extended European Search Report dated May 12, 2022 received in European Patent Application No. EP20805914.7.

Extended European Search Report dated May 31, 2022 received in European Patent Application No. EP20806478.2.

(56) References Cited

OTHER PUBLICATIONS

Extended European Search Report dated May 2, 2022 received in European Patent Application No. EP20806080.6.
3GPP TSG-RAN WG2 Meeting #101, "R2-1803664: Consideration on GSMA NR indication requirements," Feb. 26-Mar. 2, 2018, 3 pages.
3GPP TSG-RAN3 Meeting #83, "R3-140045: Scenarios and Use Cases for Multi-RAT UE Steering," Feb. 10-14, 2014, 8 pages.
3GPP TSG-RAN WG2 #83, "R2-132718: (Rel-12 LTE SC SI—Control Plane Dual Connectivity)—Control Plane Aspects with Dual Connectivity for Small Cell Deployments," Aug. 19-23, 2013, 4 pages.
3GPP TS 36.331 V14.0.0, "Technical Specification Group Radio Access Network; Evolved Universal Terrestrial Radio Access (E-UTRA); Radio Resource Contril (RRC); Protocol specification (Release 14)," Sep. 2016, 6 pages.
3GPP TSG-RAN WG2 Meeting #85, "R2-140347: On RRC design for Dual Connectivity," Feb. 10-14, 2014, 4 pages.
3GPP TSG-RAN2#106, "R2-1905587—UE measurement behavior for cell reporting," Apr. 13-17, 2019, 3 pages.
3GPP TSG-RAN WG2 #99, "R2-1707889 :Open issues of SCG Failure," Aug. 25, 2017, 5 pages.
3GPP TSG-RAN WG2 Meeting #91bis, "R2-154456: 36.300 CR for capturing B5C and PUCCH on SCell," Oct. 5-9, 2015, 6 pages.
NTT DOCOMO, "S2-170934_Interworking between NGC and EPC," Working Draft (2015) 22 pages.
3GPP TSG RAN Meeting 83, "RP-190481: On the Scope of NR UE Power Saving WI," Mar. 18-21, 2019, 4 pages.
Notification to Grant Patent Right for Invention, Chinese Application No. 201910872344.4, mailed Sep. 13, 2021 (4 pages).
Chinese First office action, Chinese Application No. 201910872770.8, mailed Feb. 10, 2021 (15 pages).
International search report, International Application No. PCT/CN2020/086155, mailed Jul. 22, 2020 (14 pages).
Chinese First office action, Chinese Application No. 201910869562.2, mailed Aug. 26, 2020 (12 pages).
Chinese second office action, Chinese Application No. 201910869562.2, mailed Dec. 7, 2020 (13 pages).
Chinese third office action, Chinese Application No. 201910869562.2, mailed Mar. 9, 2021 (12 pages).
Rejection decision, Chinese Application No. 201910869562.2, mailed Apr. 28, 2021 (20 pages).
Chinese First office action, Chinese Application No. 201910872989.8, mailed Nov. 30, 2020 (16 pages).
Notification to Grant Patent Right for Invention, Chinese Application No. 201910872989.8, mailed Feb. 5, 2021 (6 pages).
Chinese First office action, Chinese Application No. 201910871718.0, mailed Nov. 17, 2020 (16 pages).
Chinese second office action, Chinese Application No. 201910871718.0, mailed Jan. 21, 2021 (20 pages).
Notification to Grant Patent Right for Invention, Chinese Application No. 201910871718.0, mailed Mar. 26, 2021 (4 pages).
Chinese office action, Chinese Application No. 201910872915.4, mailed Nov. 24, 2020 (14 pages).
Chinese second office action, Chinese Application No. 201910872915.4, mailed Feb. 7, 2021 (10 pages).
Notification to Grant Patent Right for Invention, Chinese Application No. 201910872915.4, mailed May 14, 2021 (6 pages).
Chinese First office action, Chinese Application No. 201910869968.0, mailed Oct. 12, 2020 (12 pages).
Chinese second office action, Chinese Application No. 201910869968.0, mailed Jan. 28, 2021 (12 pages).
Chinese third office action, Chinese Application No. 201910869968.0, mailed Apr. 27, 2021 (12 pages).
Rejection decision, Chinese Application No. 201910869968.0, mailed Jul. 6, 2021 (17 pages).
Chinese First office action, Chinese Application No. 201910869835.3, mailed Sep. 2, 2020 (125 pages).
Chinese second office action, Chinese Application No. 201910869835.3, mailed Jan. 22, 2021 (8 pages).
Notification to Grant Patent Right for Invention, Chinese Application No. 201910869835.3, mailed Mar. 24, 2021 (6 pages).
Chinese First office action, Chinese Application No. 201910870118.2, mailed Dec. 2, 2020 (26 pages).
Chinese second office action, Chinese Application No. 201910870118.2, mailed Feb. 22, 2021 (16 pages).
Notification to Grant Patent Right for Invention, Chinese Application No. 201910870118.2, mailed May 7, 2021 (6 pages).
Chinese First office action, Chinese Application No. 201910870158.7, mailed Dec. 7, 2020 (28 pages).
Chinese second office action, Chinese Application No. 201910870158.7, mailed Feb. 22, 2021 (24 pages).
Notification to Grant Patent Right for Invention, Chinese Application No. 201910870158.7, mailed May 14, 2021 (6 pages).
Chinese First office action, Chinese Application No. 201910872388.7, mailed Dec. 9, 2020 (21 pages).
Chinese second office action, Chinese Application No. 201910872388.7, mailed Mar. 8, 2021 (14 pages).
Rejection decision, Chinese Application No. 201910872388.7, mailed Jun. 2, 2021 (27 pages).
Chinese First office action, Chinese Application No. 201910869972.7, mailed Jun. 23, 2021 (20 pages).
Chinese First office action, Chinese Application No. 201910872391.9, mailed Oct. 19, 2020 (22 pages).
Notification to Grant Patent Right for Invention, Chinese Application No. 201910872391.9, mailed Jan. 12, 2021 (6 pages).
Chinese First office action, Chinese Application No. 201910872430.5, mailed Dec. 10, 2020 (26 pages).
Notification to Grant Patent Right for Invention, Chinese Application No. 201910872430.5, mailed Mar. 3, 2021 (6 pages).
Chinese First office action, Chinese Application No. 201910872344.4, mailed Nov. 25, 2020 (13 pages).
Chinese second office action, Chinese Application No. 201910872344.4, mailed Feb. 20, 2021 (10 pages).
Rejection decision, Chinese Application No. 201910872344.4, mailed May 7, 2021 (10 pages).
International search report, International Application No. PCT/CN2020/089250, mailed Jul. 29, 2020 (14 pages).
International search report, International Application No. PCT/CN2020/089253, mailed Aug. 13, 2020 (17 pages).
International search report, International Application No. PCT/CN2020/089241, mailed Aug. 10, 2020 (14 pages).
International search report, International Application No. PCT/CN2020/089226, mailed Aug. 11, 2020 (15 pages).
International search report, International Application No. PCT/CN2020/086150, mailed Jul. 21, 2020 (15 pages).
International search report, International Application No. PCT/CN2020/086115, mailed Jul. 22, 2020 (15 pages).
International search report, International Application No. PCT/CN2020/090693, mailed Jul. 29, 2020 (18 pages).
International search report, International Application No. PCT/CN2020/086163, mailed Jul. 20, 2020 (15 pages).
3GPP TSG RAN WG1 Meeting #77, "Dynamic power allocation for power limited UE in dual-connectivity", R1-142069, May 23, 2014, 4 pages.
3GPP TSG-RAN4 Meeting NR Adhoc#3, "R4-1709425 NR PSCell Addition and Release Delay", Sep. 18-21, 2017, 2 pages.
3GPP TSG RAN WG1 Meeting #97, "R1-1906419 Discussion on power control for NR-DC", R1-1906419, May 13-17, 2019, 6 pages.
3GPP TSG-RAN WG2 Meeting #99bis, "R2-1710927_Impacts of dual camping UE," Oct. 9-13, 2017, 6 pages.
Communication pursuant to Article 94(3) EPC for European application 20805778.6 mailed Aug. 4, 2023.
Communication pursuant to Article 94(3) EPC for European application 20806210.9 mailed Jul. 14, 2023.
Huawei (Rapporteur)"Report and summary of email discussion [87#22] [LTE/DC] S-RLF and Reestablishment "3GPP TSG-RAN WG2 Meeting #87, R2-144540, Shanghai, China, Oct. 6, 2014, 29 pages.
Samsung, "Remaining Issues for SCG Failure"3GPP TSG-RAN WG2#100 Meeting, R2-1713923,Nov. 27, 2017,2 pages.

(56) References Cited

OTHER PUBLICATIONS

Ericsson. "MCG RLF handling in case of NE-DC (TP to 37.340)"3GPP TSG-RAN WG2 #101Bis Tdoc, R2-1805449,Apr. 16, 2018, 5 pages.
Huawei et al. "CR on 38.331 for SCG failure in NR-DC"3GPP TSG-RAN2 Meeting #103bis, R2-1815409,Oct. 8, 2018.
Interdigital (Rapporteur),"Report on email discussion on [107#32][NR/DCCA] MCG SCell/SCG Resume",3GPP TSG-RAN WG2#107bis, R2-1912880,Oct. 14, 2019,43 pages.
Non-Final Rejection dated Jul. 10, 2023 received in U.S. Appl. No. 17/525,550.
Non-Final Rejection dated Apr. 27, 2023 received in U.S. Appl. No. 17/523,557.
International Search Report and Written Opinion date Jul. 29, 2020 in International Application No. PCT/CN2020/089250. English translation attached.
3GPP TSG-RAN WG2 #99, CATT."Open issues of SCG Failure", 3GPP TSG-RAN WG2 #99 R2-170889, Aug. 25, 2017, Section 2-3. 5 pages.
First Office Action from corresponding Chinese Application No. 201910872430.5, dated Dec. 10, 2020. English translation attached.
3GPP. "Evolved Universal Terrestrial Radio Access (E-UTRA); Radio Resource Control (RRC);Protocol specification (Release 14)", 3GPP TS 36.331 V14.0.0, Sep. 30, 2016, Section 5.3.11, 5.6.13., 643 pages.
Grant Notice from corresponding Chinese Application No. 201910872430.5, dated Mar. 3, 2021. English translation attached.
Reexamination Decision from patent family application No. CN201910869562.2, dated Mar. 31, 2022. English translation attached.
Reexamination Decision from patent family application No. CN201910869968.0, dated Feb. 25, 2022. English translation attached.
Grant Notice from patent family application No. CN201910869968.0, dated Mar. 14, 2022. English translation attached.
Rejection Decision from patent family application No. CN201910869972.7, dated Mar. 23, 2022. English translation attached.
First Office Action from corresponding Chinese Application No. CN201910870646.8, dated Feb. 15, 2022. English translation attached.
First Office Action from corresponding Chinese Application No. CN202110429949.3, dated Feb. 24, 2022. English translation attached.
Grant Notice from patent family application No. CN202110429949.3, dated Apr. 20, 2022. English translation attached.
Extended European Search Report dated Mar. 25, 2022 received in European Patent Application No. EP20805778.6.
Extended European Search Report dated Mar. 23, 2022 received in European Patent Application No. EP20806210.9.
Second Office Action from patent family application No. CN201910869972.7, dated Nov. 1, 2021. English translation attached.
Third Office Action from patent family application No. CN201910869972.7, dated Jan. 10, 2022. English translation attached.
Notification of Reexamination from patent family application No. CN201910869562.2, dated Dec. 30, 2021. English translation attached.
Grant Notice from patent family application No. CN201910872388.7, dated Nov. 1, 2021. English translation attached.
Intent to Grant from corresponding Chinese Application No. 201910869972.7, dated Nov. 15, 2022. English translation attached.
Rejection Decision from corresponding Chinese Application No. 201910870646.8, dated Dec. 23, 2022. English translation attached.
Second Office Action dated Aug. 19, 2022 received in Chinese Patent Application No. CN201910870646.8.
Reexamination Decision dated Oct. 31, 2022 received in Chinese Patent Application No. CN201910869972.7.
Grant Notice dated Nov. 29, 2023 received in U.S. Appl. No. 17/525,550.
Non-Final Rejection dated Jan. 19, 2024 received in U.S. Appl. No. 17/510,354.
Non-Final Rejection dated Dec. 7, 2023 received in U.S. Appl. No. 17/526,752.
The First Office Action from corresponding Chinese Application No. 202111213586.6, dated Jan. 4, 2024. English translation attached.
The First Office Action from corresponding Chinese Application No. 202111214103.4, dated Jan. 11, 2024. English translation attached.
Corrected Notice of Allowability dated Feb. 12, 2024 received in U.S. Appl. No. 17/525,550.
Requirement for Restriction dated Feb. 1, 2024 received in U.S. Appl. No. 17/519,081.
Communication pursuant to Article 94(3) EPC for European application 20806080.6 mailed Apr. 2, 2024.
Communication pursuant to Article 94(3) EPC for European application 20806215.8 mailed Apr. 2, 2024.
Communication pursuant to Article 94(3) EPC for European application 20805914.7 mailed Apr. 29, 2024.
Non-Final Rejection for U.S. Appl. No. 17/519,081 mailed Apr. 18, 2024.
Non-Final Rejection for U.S. Appl. No. 17/526,615 mailed Jun. 3, 2024.
The Final Rejection from corresponding U.S. Appl. No. 17/519,081, dated Aug. 8, 2024.
The Reexamination notice from corresponding Chinese Application No. 201910870646.8, dated Aug. 23, 2024.

\* cited by examiner

MEASUREMENT REPORTING METHOD, ELECTRONIC DEVICE, AND STORAGE MEDIUM

CROSS-REFERENCE TO RELATED APPLICATION

The present application is a continuation of International Application No. PCT/CN2020/089250, filed on May 8, 2020, which is based on and claims priorities to Chinese Patent Application No. 201910872430.5, filed on Sep. 16, 2019, and Chinese Patent Application No. 201910405971.7, filed on May 16, 2019, the entire contents of which are hereby incorporated by reference.

TECHNICAL FIELD

The present disclosure relates to the field of wireless communication technologies, and more particularly, to a measurement reporting method, an electronic device, and a storage medium.

BACKGROUND

The New Radio (NR) system supports a Standalone (SA) architecture and a Non-Standalone (NSA) architecture. A typical NSA architecture is a Dual Connectivity (DC) architecture.

In the DC architecture, the terminal device can work in a DC mode. In the DC mode, the terminal establishes a connection with each of two network devices in the NSA architecture. For example, the terminal device establishes a connection with each of a network device in a Long Term Evolution (LTE) system and a network device in an NR system. In this case, there is a problem that the terminal device consumes a lot of power and has a short battery life.

SUMMARY

Embodiments of the present disclosure provide a measurement reporting method, an electronic device, and a storage medium, capable of saving power consumption of a terminal device and prolonging battery life of the terminal device.

Technical solutions of the embodiments of the present disclosure are implemented as follows.

In a first aspect, an embodiment of the present disclosure provides a measurement reporting method. The method includes: transmitting, by a terminal device while the terminal device has access to both a first network and a second network, Secondary Cell Group (SCG) failure information to a network device, the SCG failure information including no measurement result for the second network; and establishing, by the terminal device, a connection with the network device via the first network, without reporting any measurement result for the second network to the network device.

In the above solution, the method further includes, subsequent to transmitting, by the terminal device, the SCG failure information to the network device: receiving, by the terminal device, a measurement request message transmitted by the network device. The measurement request message is used to request the terminal device to perform a measurement on the second network.

In the above solution, the method further includes receiving, by the terminal device, a first network connection mode configured by the network device. The terminal device has access to the first network only in the first network connection mode.

In the above solution, the method further includes: performing, by the terminal device, a measurement on the second network; and reporting, by the terminal device, a measurement result for the second network to the network device.

In the above solution, the first network is an LTE network, and the second network is an NR network.

In a second aspect, an embodiment of the present disclosure provides a measurement reporting method. The method includes: receiving, by a network device, SCG failure information transmitted by a terminal device while the terminal device has access to both a first network and a second network, the SCG failure information including no measurement result for the second network; and establishing, by the network device, a connection with the terminal device via the first network without receiving any measurement result for the second network from the terminal device.

In the above solution, the method further includes, subsequent to said receiving, by the network device, the SCG failure information: transmitting, by the network device, a measurement request message to the terminal device. The measurement request message is used to request the terminal device to perform a measurement on the second network.

In the above solution, the method further includes configuring, by the network device, a first network connection mode for the terminal device. The terminal device has access to the first network only in the first network connection mode.

In the above solution, the method further includes receiving, by the network device, a measurement result for the second network reported by the terminal device.

In the above solution, the first network is an LTE network, and the second network is an NR network.

In a third aspect, an embodiment of the present disclosure further provides a terminal device. The terminal device includes a first transmitting unit and a first processing unit. The first transmitting unit is configured to transmit, while the terminal device has access to both a first network and a second network, SCG failure information to a network device. The SCG failure information includes no measurement result for the second network. The first processing unit is configured to establish, by the terminal device, a connection with the network device via the first network, without reporting any measurement result for the second network to the network device.

In the above solution, the terminal device further includes a first receiving unit configured to receive a measurement request message transmitted by the network device. The measurement request message is used to request the terminal device to perform a measurement on the second network.

In the above solution, the terminal device further includes a second receiving unit configured to receive a first network connection mode configured by the network device. The terminal device has access to the first network only in the first network connection mode.

In the above solution, the first processing unit is configured to perform a measurement on the second network, and report a measurement result for the second network to the network device.

In the above solution, the first network is an LTE network, and the second network is an NR network.

In a fourth aspect, an embodiment of the present disclosure further provides a network device. The network device includes a third receiving unit configured to receive SCG failure information transmitted by a terminal device while the terminal device has access to both a first network and a second network. The SCG failure information includes no measurement result for the second network. No measurement result for the second network from the terminal device is received. The terminal device establishes a connection with the network device via the first network.

In the above solution, the network device further includes a second transmitting unit configured to transmit a measurement request message to the terminal device. The measurement request message is used to request the terminal device to perform a measurement on the second network.

In the above solution, the network device further includes a second processing unit configured to configure a first network connection mode for the terminal device. The terminal device has access to the first network only in the first network connection mode.

In the above solution, the third receiving unit is further configured to receive a measurement result for the second network reported by the terminal device.

In the above solution, the first network is an LTE network, and the second network is an NR network.

In a fifth aspect, an embodiment of the present disclosure further provides a terminal device. The terminal device includes a processor and a memory for storing a computer program executable on the processor. The processor is configured to run the computer program to perform operations of the measurement reporting method executed by the terminal device.

In a sixth aspect, an embodiment of the present disclosure further provides a network device. The network device includes a processor and a memory for storing a computer program executable on the processor. The processor is configured to run the computer program to perform operations of the measurement reporting method executed by the network device.

In a seventh aspect, an embodiment of the present disclosure further provides a storage medium. The storage medium stores an executable program. The executable program, when executed by a processor, implements operations of the measurement reporting method executed by the terminal device.

In an eighth aspect, an embodiment of the present disclosure further provides a storage medium. The storage medium stores an executable program. The executable program, when executed by a processor, implements operations of the measurement reporting method executed by the network device.

With the measurement reporting method, the electronic device, and the storage medium according to the embodiments of the present disclosure, the SCG failure information is transmitted to the network device by the terminal device while the terminal device has access to both the first network and the second network. The SCG failure information includes no measurement result for the second network. In addition, after receiving the measurement request for the second network from the network device, the terminal device reports no measurement result for the second network to the network device. By actively triggering an SCG failure strategy, the network device can be controlled not to configure an Evolved universal mobile telecommunications system terrestrial radio access-New radio Dual Connectivity (EN-DC) mode for the terminal device, which saves the power consumption of the terminal device and prolongs the battery life of the terminal device.

DESCRIPTION OF EMBODIMENTS

The present disclosure will be further described in detail below in combination with the accompanying drawings and embodiments. It should be understood that specific embodiments described here are only used to explain, rather than to limit, the present disclosure.

The embodiments of the present disclosure provide a measurement reporting method and an electronic device. The electronic device, as an entity that implements the measurement reporting method, can be implemented in various ways in practical applications. For example, the electronic device can be a smart phone, a tablet computer, a laptop, or a wearable device (such as a pair of smart glasses and a smart watch). The operating system of the electronic device can be an Android operating system, an IOS operating system, or any other operating system developed by a third-party that can run on a microcomputer structure (including at least a processor and a memory), e.g., a mobile version of Linux system, the BlackBerry's QNX operating system. In the figures of the embodiments of the present disclosure, the electronic device is illustrated as a smart phone by way of example. This does not constitute a limitation on the type of the electronic device to which technical solutions described in the embodiments of the present disclosure are applicable.

Figure 1:
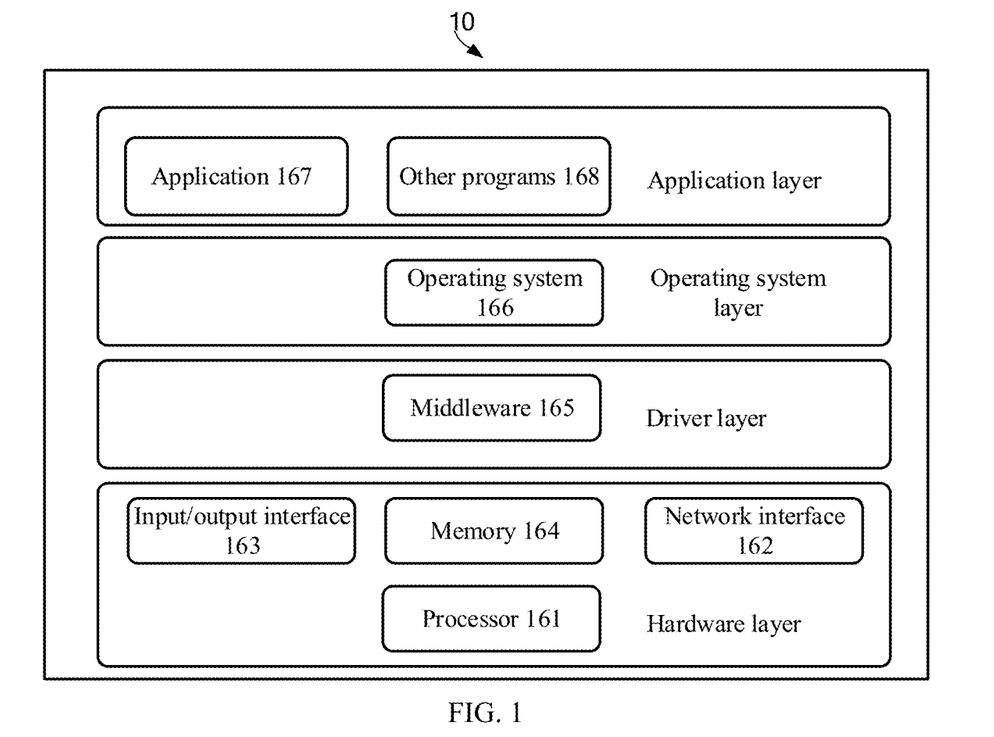
FIG. 1 is a block diagram showing a software/hardware structure of an electronic device according to an embodiment of the present disclosure.

Referring to FIG. 1, in terms of its software/hardware structure, an electronic device 10 can include a hardware layer, a driver layer, an operating system layer, and an application layer. However, those skilled in the art should understand that the electronic device 10 used for information processing may be provided with more components than those illustrated in FIG. 1 according to implementation requirements, or some components can be omitted according to implementation requirements.

The hardware layer of the electronic device 10 can include a processor 161, an input/output interface 163, a memory 164, and a network interface 162. The components can be connected and communicate with each other via a system bus.

The processor 161 can be implemented by a Central Processing Unit (CPU), a Microcontroller Unit (MCU), an Application Specific Integrated Circuit (ASIC), or a Field Programmable Gate Array (FPGA).

The input/output interface 163 can be implemented by using an input/output device such as a display screen, a touch screen, and a speaker.

The memory 164 can be implemented as a non-volatile storage medium such as a flash memory, a hard disk, and an optical disc, or can be implemented as a volatile storage medium such as Double Data Rate (DDR) dynamic cache. The memory 164 stores executable instructions for executing the above measurement reporting method.

The network interface 162 can provide the processor 161 with ability to access external data from for example the memory 164 located in a remote position, based on a network transmission protocol such as a Transfer Control Protocol (TCP)/a User Datagram Protocol (UDP).

The driver layer can include middleware 165 for an operating system 166 to recognize the hardware layer and communicate with each component of the hardware layer. For example, the driver layer can be a collection of drivers for respective components of the hardware layer.

The operating system 166 can be configured to provide a user-oriented graphical interface, and support a user to control a pointing device via the graphical interface. The embodiments of the present disclosure do not limit the software environment of the above device, e.g., the type and version of the operating system. For example, the software environment can be a Linux operating system, a UNIX operating system, and the like.

The application layer can include an application 167 for implementing the measurement reporting method according to the embodiments of the present disclosure, and of course, can include other programs 168.

The architecture for applying the measurement reporting method according to the embodiments of the present disclosure will be briefly described below. In a DC architecture illustrated in FIG. 2, a terminal device 101 can establish an air interface connection with a main network device 102 (also referred to as a primary node) to realize communication with the main network device 102. The terminal device 101 can also establish an air interface connection with an auxiliary network device 103 (also referred to as a secondary node) to realize communication with the auxiliary network device 103. The terminal device 101 can also establish air interface connections with both the main network device 102 and the auxiliary network device 103 to realize communication with both the main network device 102 and the auxiliary network device 103.

Figure 2:
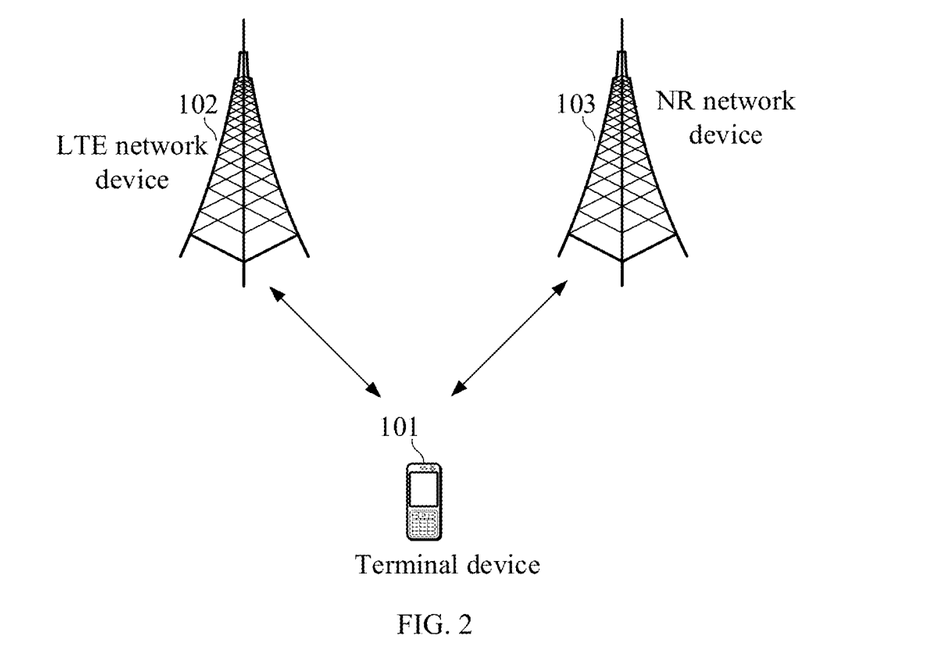
FIG. 2 is a schematic diagram illustrating an architecture for applying a measurement reporting method according to an embodiment of the present disclosure.

In the DC mode, the terminal device 101 can simultaneously establish two connections with the main network device 102 and the auxiliary network device 103. The main network device 102 can be mainly responsible for transmitting signaling, while the auxiliary network device 103 can be responsible for transmitting data. The technical solutions of the embodiments of the present disclosure are mainly aimed at terminals in the DC mode.

Types of the main network device 102 and the auxiliary network device 103 illustrated in FIG. 2 can be the same or different. In an example, the main network device 102 can be an LTE network device, and the auxiliary network device 103 can be an NR network device. In another example, the main network device 102 can be an NR network device, and the auxiliary network device 103 can also be an NR network device. In yet another example, the main network device 102 can be an NR network device, and the auxiliary network device 103 can be an LTE network device. The embodiments of the present disclosure do not limit types of the main network device 102 and the auxiliary network device 103.

In an example, the DC mode can be an EN-DC mode or a Next Generation EN-DC (NGEN-DC) mode. In this case, the main network device can be an LTE network device, the auxiliary network device can be an NR network device, and the terminal can communicate with both the LTE network device and the NR network device.

In another example, the DC mode can be a New radio-Evolved universal mobile telecommunications system terrestrial radio access DC (NE-DC) mode. In this case, the main network device can be an NR network device, the auxiliary network device can be an LTE network device, and the terminal can communicate with both the LTE network device and the NR network device.

It should be noted that the DC mode is not limited to the EN-DC mode and NE-DC mode, and the embodiments of the present disclosure do not limit a specific type of the DC mode.

In a specific implementation, the main network device and the auxiliary network device can be in a co-site deployment (e.g., the NR network device and the LTE network device can be arranged on one physical device), or in a non-co-site deployment (e.g., the NR network device and the LTE network device can be arranged on different physical devices), and the present disclosure is not limited to any of these examples. Here, the LTE network device can also be referred to as an evolved Node B (eNB), and the NR network device can also be referred to as a next generation Node B (gNB). It should be noted that the present disclosure does not limit a relationship between coverages of the main network device and the auxiliary network device. For example, the coverages of the main network device and the auxiliary network device may overlap with each other.

The specific type of the terminal device 101 is not limited in the present disclosure. The terminal device 101 can be any user device that supports the DC mode, such as a smart phone, a personal computer, a laptop, a tablet computer, and a portable wearable device.

The technical solutions of the present disclosure and how the technical solutions of the present disclosure solve the above technical problems will be described in detail below with reference to the embodiments and in combination with the accompanying drawings. The following specific embodiments can be combined with each other, and the same or similar concepts or processes may be omitted in some embodiments.

In the above, the electronic device involved in the embodiments of the present disclosure has been described in terms of its functions. Based on the software/hardware structure of the electronic device illustrated in FIG. 1 and the network architecture illustrated in FIG. 2, the network connection solution provided according to the embodiments of the present disclosure will be further described.

Figure 3:
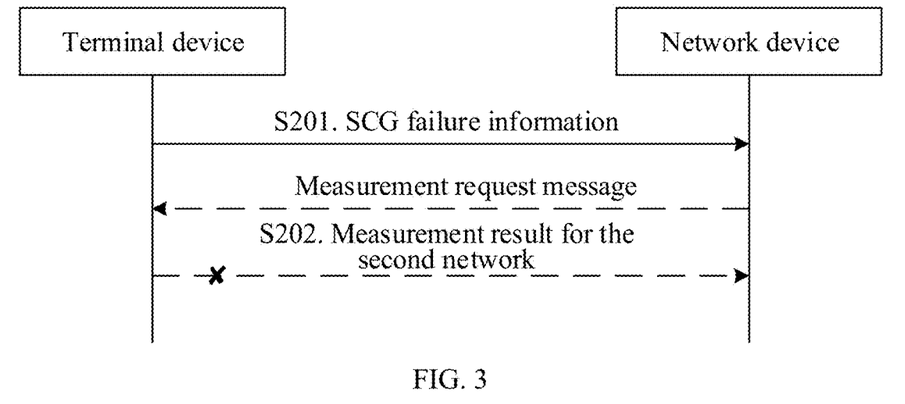
FIG. 3 is a flowchart illustrating a measurement reporting method applied in a terminal device according to an embodiment of the present disclosure.

FIG. 3 is a flowchart illustrating a measurement reporting method according to an embodiment of the present disclosure, which will be described in terms of individual operations.

In block S201, Secondary Cell Group (SCG) failure information is transmitted to a network device by a terminal device while the terminal device has access to both a first network and a second network.

In an embodiment of the present disclosure, the terminal device can be in the DC mode. In the DC mode, the terminal device can communicate with both a first network device and a second network device. In an optional implementation, the first network device can be an auxiliary network device, and the second network device can be a main network device. The auxiliary network device can be responsible for transmitting data, and the main network device can be mainly responsible for transmitting signaling. Referring to FIG. 2, the device can form a DC architecture with the first network device and the second network device.

In an embodiment of the present disclosure, the DC mode can be, for example, the EN-DC mode, or the NGEN-DC mode, or the NE-DC mode. Taking the EN-DC mode as an example, the second network device can be an NR network device (i.e., gNB), the first network device can be an LTE network device (i.e., eNB), and the terminal device can communicate with both the NR network device and the LTE network device. Compared with that the terminal device in a single connection mode needs to communicate with one network device (such as the LTE network device or the NR network device), the terminal device in the DC mode consumes more power. Therefore, the embodiment of the present disclosure limits a transmission rate of the terminal to save the power consumption of the terminal in the DC mode.

Figure 4:
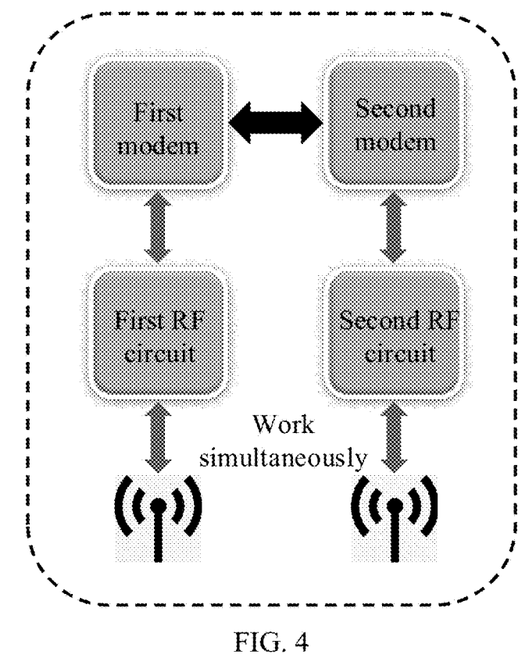
FIG. 4 is a block diagram showing a structure of a communication module of a terminal device in a DC mode according to an embodiment of the present disclosure.

FIG. 4 is a block diagram showing a structure of a communication module of a terminal device in a DC mode. As illustrated in FIG. 4, in order to realize simultaneous communication with two network devices, the terminal device needs to be provided with two communication modules, which correspond to two network devices in a one-to-one correspondence. A first modem and a first radio frequency path (including a first radio frequency circuit and a first radio frequency antenna) can form a first communication module. The first communication module can correspond to the first network device. A second modem and a second radio frequency path (including a second radio frequency circuit and a second radio frequency antenna) can form a second communication module. The second communication module can correspond to the second network device. In an example, the second modem can be a 5G modem, the first modem can be a 4th Generation (4G) modem, the second radio frequency circuit can be 5G Radio Frequency (RF), and the first radio frequency circuit can be 4G RF. In the DC mode, the first communication module and the second communication module can work at the same time.

In an example, the terminal device can first establish a connection with the first network device, and then establish a connection with the second network device. For example, when connected to the first network device, the terminal device can receive a control instruction transmitted by the second network device. The control instruction can be used to trigger an activation of a communication function corresponding to the second network device. The terminal device can establish a connection with the second network device in response to the control instruction.

Figure 5:
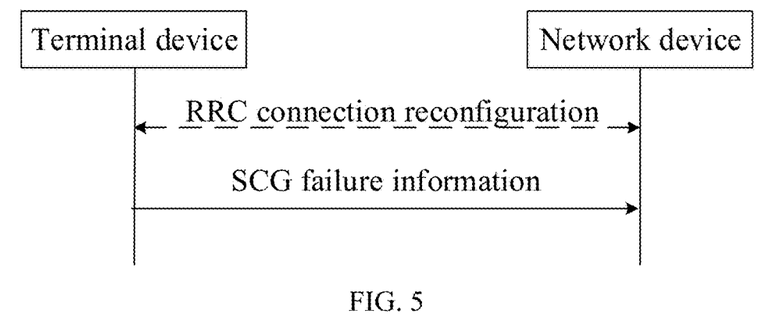
FIG. 5 is a flowchart of reporting SCG failure information by a terminal device according to an embodiment of the present disclosure.

In an embodiment of the present disclosure, the first network can be an LTE network, and the second network can be an NR network. Correspondingly, the SCG failure information can be NR SCG failure information. In a specific implementation, a process of reporting the SCG failure information by the terminal device can be as illustrated in FIG. 5. After the terminal device communicates with the network device of the LTE network based on Radio Resource Control (RRC) connection reconfiguration, the terminal device can transmit the SCG failure information to the network device of the LTE network to inform the network device of an SCG failure detected by the terminal device. The cause of the failure can be a failure of an SCG radio link, a failure to complete SCG reconfiguration carrying synchronization information, and the like. The SCG failure information does not include a measurement result for the second network.

Here, the terminal device having access to both the first network and the second network means that the terminal device is in the DC mode. When the first network is an LTE network and the second network is an NR network, the terminal device is in the EN-DC mode.

In block S202, the terminal device reports no measurement result for the second network to the network device.

In an embodiment of the present disclosure, before performing the operation at block S202, the terminal device can receive a measurement request message transmitted by the network device. The measurement request message can be used to request the terminal device to perform a measurement on the second network.

Figure 6:
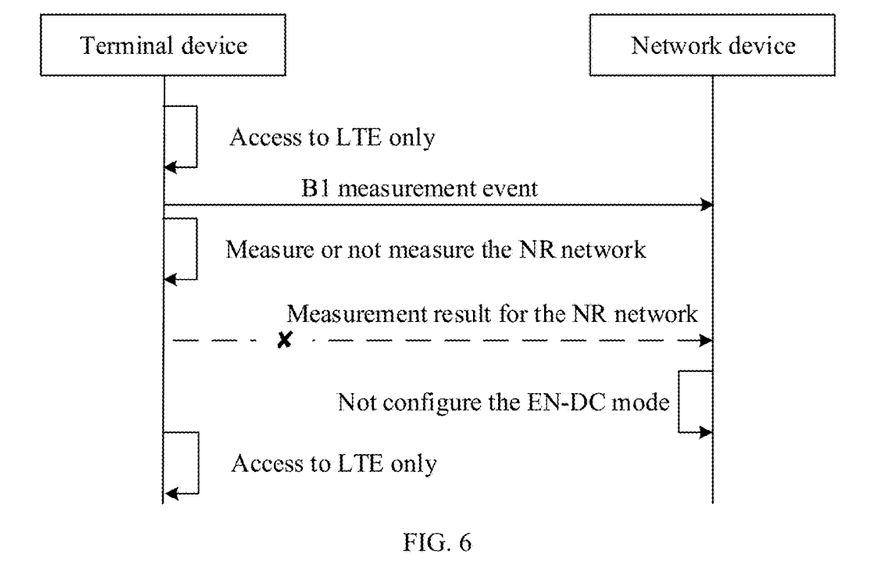
FIG. 6 is a flowchart of reporting a measurement based on an LTE to NR B1 event according to an embodiment of the present disclosure.

In a specific implementation, the measurement request message can be implemented by an LTE to NR B1 event triggered by the network device for the terminal device. The measurement request message can be used to request the terminal device to perform a measurement on a second cell corresponding to the second network. A measurement reporting process based on the LTE to NR B1 event is as illustrated in FIG. 6. When the terminal device only has access to the LTE network, the network device can configure a B1 measurement event for the terminal device, and the terminal device may measure or not measure the NR network. However, the terminal device reports no measurement result for the NR network to the network device. When the network device receives no measurement result for the NR network, the network device does not configure the EN-DC mode for the terminal device, and the terminal device still only has access to the LTE network.

In some embodiments, the terminal device reporting no measurement result for the second network to the network device can include that after receiving the measurement request message transmitted by the network device, the terminal device performs the measurement on the second network to obtain a measurement result, but does not report the measurement result to the network device.

In other embodiments, the terminal device reporting no measurement result for the second network to the network device can include that the terminal device has never performed the measurement on the second network, and performs no measurement on the second network after receiving the measurement request message transmitted by the network device.

In still other embodiments, the terminal device reporting no measurement result for the second network to the network device can include that the terminal device is performing the measurement on the second network, but suspends the measurement on the second network after receiving the measurement request message transmitted by the network device, and does not report any measurement result that has been obtained for the second cell to the network device.

In at least one embodiment of the present disclosure, after the operation at block S202, the method can further include the following operations.

The terminal device receives a network connection mode configured by the network device.

In an embodiment of the present disclosure, since the terminal device reports no measurement report for the second network to the network device, a network connection mode configured by the network device for the terminal device is the single connection mode. In the single connection mode, the terminal device can only access the first network. In a scenario where the terminal device switches from the DC mode to the single connection mode, the network device can be the main network device, and the main network device can transmit a message to the auxiliary network device in the DC mode to instruct the auxiliary network device to disconnect from the terminal device, i.e., to instruct the auxiliary network device to no longer perform data transmission with the terminal device. In a scenario where the terminal device switches from the DC mode to the single connection mode, the network device can be the main network device, and the terminal device can disconnect from the auxiliary network device before receiving single connection configuration transmitted by the network device. The auxiliary network device can transmit a message to the main network device. The message can be used to notify the main network device to perform data transmission and signaling transmission with the terminal device.

In some embodiments, if the terminal device expects to return to the DC mode, the terminal device needs to report a measurement report for the second network to the network device. After receiving the measurement report for the second network reported by the terminal device, the network device can configure the DC mode for the terminal device. For example, the network device can configure the EN-DC mode for the terminal device. When the network device configures the DC mode for the terminal device, the network device can be regarded as the main network device. The main network device may also need to transmit a message to the auxiliary network device to instruct the auxiliary network device to establish a connection with the terminal device, and to instruct the auxiliary network device to perform the data transmission with the terminal device. In this scenario, the main network device and the terminal device can perform the signaling transmission.

It should be noted that, in at least one embodiment of the present disclosure, the first network can be an LTE network, and the second network can be an NR network. Establishing a connection with the network device via the first network by the terminal device can mean that the terminal device communicates with the network device within the first network.

Figure 7:
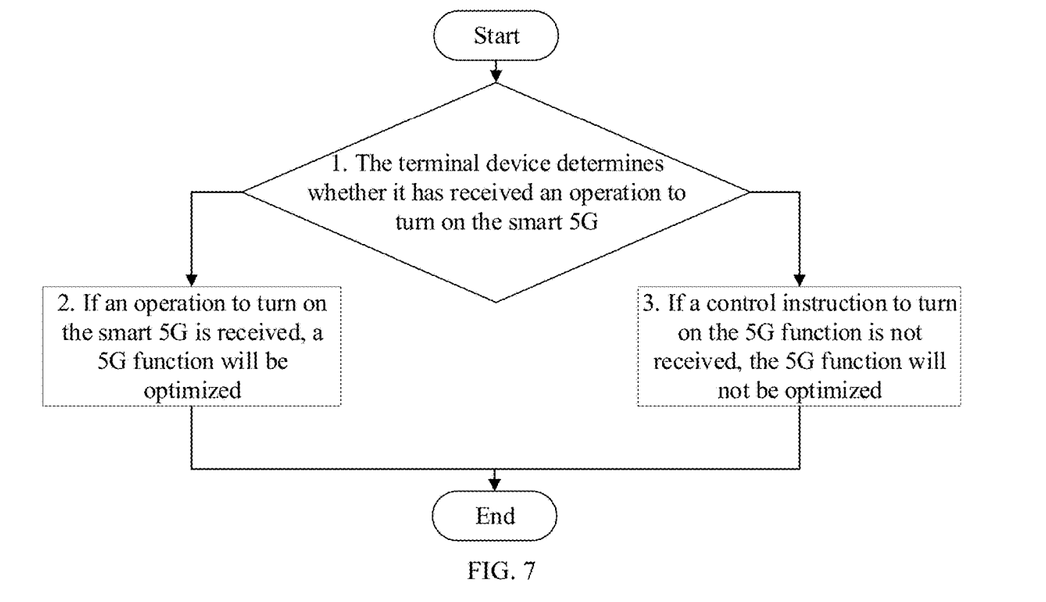
FIG. 7 is a flowchart of turning on smart 5th Generation (5G) by a terminal device according to an embodiment of the present disclosure.

In an embodiment of the present disclosure, after a connection is established between the terminal device and the second network device corresponding to the second network, the terminal device can communicate with the second network device. It should be noted that the connection described in the embodiment of the present disclosure refers to an access. After the terminal device turns on a communication function with the second network device, various parameters of the terminal device need to be adjusted based on practical situations to achieve an optimal compromise between performance and power consumption, such that the user can get a better experience. As an example, the communication function corresponding to the second network device is a 5G function. FIG. 7 is a flowchart of turning on smart 5G by a terminal device. Referring to FIG. 7, turning on the smart 5G means optimizing the 5G function. Specifically, when using the 5G function, the terminal device can adjust various parameters (such as the transmission rate) of the terminal device based on practical situation. As illustrated in FIG. 7, turning on the smart 5G by the terminal device can include the following processes.

1. The terminal device can determine whether it has received an operation to turn on the smart 5G.

Here, the terminal displays a user interface. The user interface can include an option to turn on the smart 5G. The user can trigger an operation to select the option corresponding to the smart 5G, thereby turning on the smart 5G. Here, the operation triggered by the user may be a touch operation, a key pressing operation, a voice operation, a gesture operation, and the like.

2. If the operation to turn on the smart 5G is received, the 5G function can be optimized.

Here, an optimization of the 5G function can at least include that, after the terminal device receives the measurement request for the second network transmitted by the network device, the measurement result for the second network is not reported to the network device, thereby preventing the network device from configuring the DC mode for the terminal device, and saving the power consumption of the terminal device.

3. If a control instruction to turn on the 5G function is not received, the 5G function will not be optimized.

A first optional application scenario of the measurement reporting method according to an embodiment of the present disclosure can be that, when detecting that a currently running application belongs to a predetermined application blacklist, the terminal device can enable a restriction of the communication function corresponding to the second network device. When the communication function corresponding to the second network device starts to be restricted, the terminal device can transmit the SCG failure information to the network device. The SCG failure information can include no measurement result for the second network. In addition, after receiving a measurement request for the second network from the network device, the terminal device can report no measurement result for the second network to the network device. By actively triggering an SCG failure strategy, the network device can be controlled not to configure the EN-DC mode for the terminal device, which saves the power consumption of the terminal device and prolongs the battery life of the terminal device. For example, if the terminal device detects that an application A and an application B are currently running and that the application B belongs to the predetermined application blacklist, the communication function corresponding to the second network device can be restricted.

A second optional application scenario of the measurement reporting method according to an embodiment of the present disclosure can be that, when detecting that a Voice over Long-Term Evolution (Volte) call is in progress, the terminal device can enable a restriction of the communication function corresponding to the second network device. When the communication function corresponding to the second network device starts to be restricted, the terminal device can transmit the SCG failure information to the network device. The SCG failure information can include no measurement result for the second network. In addition, after receiving the measurement request for the second network from the network device, the terminal device can report no measurement result for the second network to the network device. By actively triggering the SCG failure strategy, the network device can be controlled not to configure the EN-DC mode for the terminal device, which saves the power consumption of the terminal device and prolongs the battery life of the terminal device.

A third optional application scenario of the measurement reporting method according to an embodiment of the present disclosure can be that: when the terminal device is in a screen-off state, the terminal device can enable a restriction of the communication function corresponding to the second network device. When the communication function corresponding to the second network device starts to be restricted, the terminal device can transmit the SCG failure information to the network device. The SCG failure information can include no measurement result for the second network. In addition, after receiving the measurement request for the second network from the network device, the terminal device can report no measurement result for the second network to the network device. By actively triggering the SCG failure strategy, the network device can be controlled not to configure the EN-DC mode for the terminal device, which saves the power consumption of the terminal device and prolongs the battery life of the terminal device.

The screen-off state means that a display screen of the terminal device is in a non-display state.

A fourth optional application scenario of the measurement reporting method according to an embodiment of the present disclosure can be that: when signals of the terminal device under the second network are weaker than signals under the first network and the signal intensity of the terminal device under the second network is smaller than a predetermined threshold, the terminal device can enable a restriction of the communication function corresponding to the second network device. When the communication function corresponding to the second network device starts to be restricted, the terminal device can transmit the SCG failure information to the network device. The SCG failure information can include no measurement result for the second network. In addition, after receiving the measurement request for the second network from the network device, the terminal device can report no measurement result for the second network to the network device. By actively triggering the SCG failure strategy, the network device can be controlled not to configure the EN-DC mode for the terminal device, which saves the power consumption of the terminal device and prolongs the battery life of the terminal device.

A fifth optional application scenario of the measurement reporting method according to an embodiment of the present disclosure can be that: the terminal device can detect a temperature of the terminal device, and can enable a restriction of the communication function corresponding to the second network device when the temperature of the terminal device is greater than or equal to a target threshold. When the communication function corresponding to the second network device starts to be restricted, the terminal device can transmit the SCG failure information to the network device. The SCG failure information can include no measurement result for the second network. In addition, after receiving the measurement request for the second network from the network device, the terminal device can report no measurement result for the second network to the network device. By actively triggering the SCG failure strategy, the network device can be controlled not to configure the EN-DC mode for the terminal device, which saves the power consumption of the terminal device and prolongs the battery life of the terminal device. Exemplarily, the temperature of the terminal may be reflected by a temperature of a certain piece of hardware of the terminal or an average temperature of certain pieces of hardware of the terminal, e.g., a temperature of a processor and a temperature of a memory.

Figure 8:
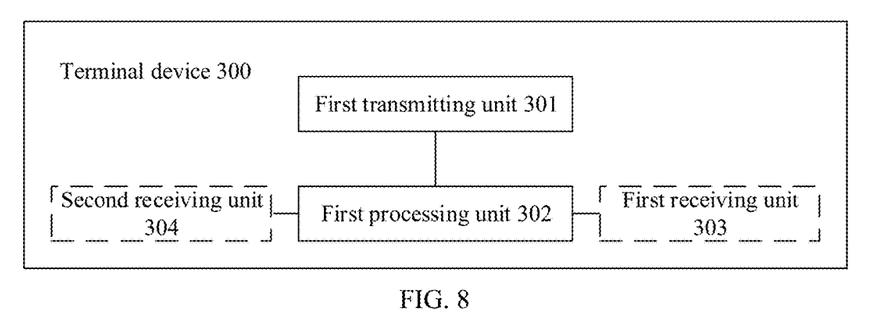
FIG. 8 is a block diagram showing a structure of a terminal device according to an embodiment of the present disclosure.

Based on the measurement reporting method according to the above embodiments, an embodiment of the present disclosure further provides a terminal device. A block diagram showing a structure of a terminal device 300 is illustrated in FIG. 8. Referring to FIG. 8, the terminal device 300 can include a first transmitting unit 301 and a first processing unit 302.

The first transmitting unit 301 can be configured to transmit, while the terminal device has access to both a first network and a second network, SCG failure information to a network device. The SCG failure information can include no measurement result for the second network.

The first processing unit 302 can be configured to establish, by the terminal device, a connection with the network device via the first network, without reporting any measurement result for the second network to the network device.

In an embodiment, the terminal device can further include a first receiving unit 303. The first receiving unit 303 can be configured to receive a measurement request message transmitted by the network device. The measurement request message can be used to request the terminal device to perform a measurement on the second network.

In an embodiment, the terminal device can further include a second receiving unit 304. The second receiving unit 304 can be configured to receive a first network connection mode configured by the network device. The terminal device has access to the first network only in the first network connection mode.

In an embodiment, the first processing unit 302 can be configured to perform a measurement on the second network, and report a measurement result for the second network to the network device.

In an embodiment, the first network can be an LTE network, and the second network can be an NR network.

Figure 9:
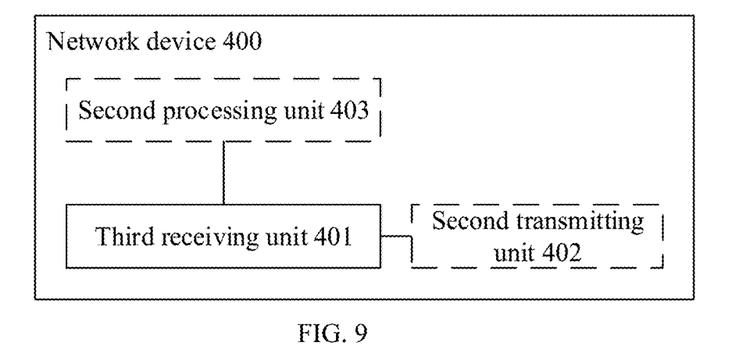
FIG. 9 is a block diagram showing a structure of a network device according to an embodiment of the present disclosure.

Based on the measurement reporting method according to the above embodiments, an embodiment of the present disclosure further provides a network device. A block diagram showing a structure of a network device 400 is illustrated in FIG. 9. Referring to FIG. 9, the network device 400 can include a third receiving unit 401.

The third receiving unit 401 can be configured to receive SCG failure information transmitted by a terminal device while the terminal device has access to both a first network and a second network. The SCG failure information can include no measurement result for the second network. No measurement result for the second network from the terminal device is received. The terminal device can establish a connection with the network device via the first network.

In an embodiment, the network device can further include a second transmitting unit 402. The second transmitting unit 402 can be configured to transmit a measurement request message to the terminal device. The measurement request message can be used to request the terminal device to perform a measurement on the second network.

In an embodiment, the network device can further include a second processing unit 403. The second processing unit 403 can be configured to configure a first network connection mode for the terminal device. The terminal device can have access to the first network only in the first network connection mode.

In an embodiment, the third receiving unit 401 can be further configured to receive a measurement result for the second network reported by the terminal device.

In an embodiment, the first network can be an LTE network, and the second network can be an NR network.

Figure 10:
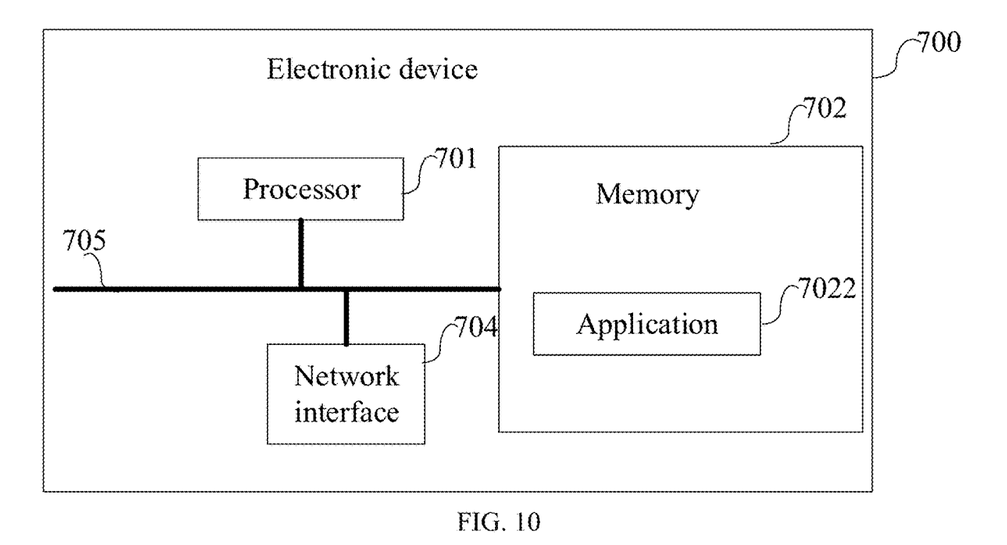
FIG. 10 is a block diagram showing a structure of an electronic device according to an embodiment of the present disclosure.

FIG. 10 is a block diagram showing a hardware composition structure of an electronic device (the terminal device or the network device) according to an embodiment of the present disclosure. An electronic device 700 can include at least one processor 701, a memory 702, and at least one network interface 704. Various components in the electronic device 700 are coupled with each other through a bus system 705. It can be understood that the bus system 705 can be configured to implement connection and communication between these components. In addition to a data bus, the bus system 705 can also include a power bus, a control bus, and a status signal bus. However, for the sake of clear description, various buses are collectively labeled as the bus system 705 in FIG. 10.

It can be understood that the memory 702 can be a volatile memory or a non-volatile memory, or the memory 702 can include both a volatile memory and a non-volatile memory. The non-volatile memory can be a Read-Only Memory (ROM), a Programmable ROM (PROM), an Erasable PROM (EPROM), an Electrically EPROM (EEPROM), a Ferromagnetic Random Access Memory (FRAM), a flash memory, a magnetic surface memory, a compact disc, or a Compact Disc Read-Only Memory (CD-ROM). The magnetic surface memory may be disk storage or tape storage. The volatile memory may be an RAM, which is used as an external high-speed cache. By way of exemplary rather than limiting description, many forms of RAM are available, such as a Static RAM (SRAM), a Synchronous Static Random Access Memory (SSRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). The memory 702 according to the embodiments of the present disclosure is intended to include, but is not limited to, these and any other suitable types of memory.

The memory 702 according to the embodiments of the present disclosure is used to store various types of data to support operations of the electronic device 700. Examples of such data can include any computer program used to operate on the electronic device 700, such as an application 7022. A program for implementing the method according to the embodiments of the present disclosure may be included in the application 7022.

The disclosed method according to the embodiments of the present disclosure can be applied in the processor 701, or implemented by the processor 701. The processor 701 may be an integrated circuit chip with signal processing capability. In an implementation, the operations of the above method can be implemented by hardware integrated logic circuits in the processor 701 or instructions in the form of software. The processor 701 can be a general-purpose processor, a Digital Signal Processor (DSP) or another programmable logic device, a discrete gate or transistor logic device, or a discrete hardware component. The methods, operations, and logical block diagrams disclosed in the embodiments of the present disclosure can be implemented or performed by the processor 701. The general-purpose processor may be a microprocessor or any conventional processor. The operations of the methods disclosed in the embodiments of the present disclosure may be directly embodied as being performed and completed by a hardware decoding processor, or by a combination of hardware and software modules in the decoding processor. The software modules can be located in a storage medium. The storage medium can be located in the memory 702. The processor 701 can read information from the memory 702 and perform the operations of the above methods in combination with its hardware.

In an exemplary embodiment, the electronic device 700 may be implemented by one or more Application Specific Integrated Circuits (ASICs), a DSP, a Programmable Logic Device (PLD), a Complex Programmable Logic Device (CPLD), an FPGA, a general-purpose processor, a controller, an MCU, a Microprocessor Unit (MPU), or other electronic components, to perform the above methods.

An embodiment of the present disclosure also provides a storage medium for storing computer programs.

In at least one embodiment, the storage medium can be applied to the terminal device in the embodiment of the present disclosure, and the computer program can cause a computer to perform corresponding procedures implemented by the terminal device in the method according to any of the embodiments of the present disclosure. Details thereof will be omitted here for simplicity.

In at least one embodiment, the storage medium can be applied to the network device in the embodiment of the present disclosure, and the computer program can cause a computer to perform corresponding procedures implemented by the network device in the method according to any of the embodiments of the present disclosure. Details thereof will be omitted here for simplicity.

The present disclosure is described with reference to flowcharts and/or block diagrams of the method, the device (system), and the computer program product according to the embodiments of the present disclosure. It should be understood that each process and/or block in the flowcharts and/or block diagrams, and a combination of processes and/or blocks in the flowcharts and/or block diagrams can be realized by computer program instructions. These computer program instructions can be provided to a processor of a general-purpose computer, a special-purpose computer, an embedded processor, or other programmable data processing device to generate a machine, such that instructions executed by the processor of the computer or other programmable data processing devices generate an apparatus for implementing functions specified in one or more processes in the flowcharts and/or one or more blocks in the block diagrams.

These computer program instructions can also be stored in a computer-readable memory that can guide a computer or other programmable data processing devices to work in a specific manner, such that instructions stored in the computer-readable memory produce an article of manufacture including an instruction device. The instruction device implements functions specified in one or more processes in the flowcharts and/or one or more blocks in the block diagrams.

These computer program instructions can also be loaded on a computer or other programmable data processing devices to enable a series of operations to be executed on the computer or other programmable devices for producing computer-implemented processing, such that instructions executed on the computer or other programmable devices provide operations for implementing functions specified in one or more processes in the flowcharts and/or one or more blocks in the block diagrams.

While the specific embodiments of the present disclosure have been described above, the protect scope of the present disclosure is not limited to these embodiments. Various variants and alternatives can be easily conceived by any of those skilled in the art without departing from the technical scope of the present disclosure. Therefore, these variants and alternatives are to be encompassed by the protect scope of present disclosure as defined by the claims as attached.

What is claimed is:

1. A measurement reporting method, comprising:
transmitting, by a terminal device while the terminal device has access to both a first network and a second network, Secondary Cell Group (SCG) failure information to a network device, the SCG failure information comprising no measurement result for the second network;
receiving, by the terminal device, a measurement request message transmitted by the network device, wherein the measurement request message is used to request the terminal device to perform a measurement on the second network; and
establishing, by the terminal device, a connection with the network device via the first network, without reporting any measurement result for the second network to the network device,
wherein when the terminal device is in a screen-off state, the terminal device enables a restriction of a communication function corresponding to a second network device, and when the communication function corresponding to the second network device starts to be restricted, the terminal device transmits the SCG failure information to the network device,
wherein when detecting that a currently running application belongs to a predetermined application blacklist, the terminal device enables a restriction of the communication function corresponding to the second network device, and when the communication function corresponding to the second network device starts to be restricted, the terminal device transmits the SCG failure information to the network device.

2. The method according to claim 1, further comprising:
receiving, by the terminal device, a first network connection mode configured by the network device, wherein the terminal device has access to the first network only in the first network connection mode.

3. The method according to claim 1, further comprising:
performing, by the terminal device, a measurement on the second network; and
reporting, by the terminal device, a measurement result for the second network to the network device.

4. The method according to claim 1, wherein the first network is a Long Term Evolution (LTE) network, and the second network is a New Radio (NR) network.

5. The method according to claim 1, wherein the measurement request message is Radio Resource Control (RRC) connection reconfiguration, and the SCG failure information is NR SCG failure information.

6. The measurement reporting method according to claim 1, wherein when detecting that a Voice over Long-Term Evolution (Volte) call is in progress, the terminal device enables a restriction of the communication function corresponding to the second network device, and when the communication function corresponding to the second network device starts to be restricted, the terminal device transmits the SCG failure information to the network device.

7. The measurement reporting method according to claim 1, wherein when signals of the terminal device under the second network are weaker than signals under the first network and an signal intensity of the terminal device under the second network is smaller than a predetermined threshold, the terminal device enables a restriction of the communication function corresponding to the second network device, and when the communication function corresponding to the second network device starts to be restricted, the terminal device transmits the SCG failure information to the network device.

8. The measurement reporting method according to claim 1, wherein the terminal device detects a temperature of the terminal device, and enables a restriction of the communication function corresponding to the second network device when the temperature of the terminal device is greater than or equal to a target threshold, and when the communication function corresponding to the second network device starts to be restricted, the terminal device transmits the SCG failure information to the network device.

9. A terminal device, comprising a processor and a memory for storing a computer program executable on the processor,
wherein the processor is configured to run the computer program to:
transmit, while the terminal device has access to both a first network and a second network, Secondary Cell Group (SCG) failure information to a network device, the SCG failure information comprising no measurement result for the second network;
receive a measurement request message transmitted by the network device, wherein the measurement request message is used to request the terminal device to perform a measurement on the second network; and
establish a connection with the network device via the first network, without reporting any measurement result for the second network to the network device,
wherein when the terminal device is in a screen-off state, the terminal device enables a restriction of a communication function corresponding to a second network device, and when the communication function corresponding to the second network device starts to be restricted, the terminal device transmits the SCG failure information to the network device,
wherein when detecting that a currently running application belongs to a predetermined application blacklist, the terminal device enables a restriction of the communication function corresponding to the second network device, and when the communication function corresponding to the second network device starts to be restricted, the terminal device transmits the SCG failure information to the network device.

10. The terminal device according to claim 9, wherein the processor is further configured to run the computer program to:
receive a first network connection mode configured by the network device, wherein the terminal device has access to the first network only in the first network connection mode.

11. The terminal device according to claim 9, wherein the processor is further configured to run the computer program to:
perform a measurement on the second network; and
report a measurement result for the second network to the network device.

12. The terminal device according to claim 9, wherein the first network is a Long Term Evolution (LTE) network, and the second network is a New Radio (NR) network.

13. The terminal device according to claim 9, wherein the measurement request message is Radio Resource Control (RRC) connection reconfiguration, and the SCG failure information is NR SCG failure information.

14. The terminal device according to claim 9, wherein the terminal device is provided with a first communication module corresponding to the first network and a second communication module corresponding to the second network, a first modem and a first radio frequency path form the first communication module, and a second modem and a second radio frequency path form the second communication module.

* * * * *